Dec. 27, 1955 G. T. JACOBI 2,728,881

ASYMMETRICALLY CONDUCTIVE DEVICES

Filed March 31, 1950

Inventor:
George T. Jacobi,
by Paul A. Frank
His Attorney.

United States Patent Office 2,728,881
Patented Dec. 27, 1955

2,728,881

ASYMMETRICALLY CONDUCTIVE DEVICES

George T. Jacobi, Schenectady, N. Y., assignor to General Electric Company, a corporation of New York Application March 31, 1950, Serial No. 153,176
18 Claims. (Cl. 317—235)

My invention relates to asymmetrically conductive devices and more particularly to devices employing the rectification phenomenon produced by a small-area contact to a semi-conductor such as germanium or silicon.

Asymmetrically conductive devices of this contact type employing a semi-conductor are well known. Such devices include a piece of electric semi-conductor material, such as silicon or germanium, which is in contact with at least two electrodes. One of the electrodes makes a small-area contact to the semi-conductor while the other electrode makes a relatively large-area contact thereto, and the rectifying action takes place within the semi-conductor between these two contacts. Such "duo-electrode" devices operate as simple rectification elements permitting a greater current flow through the semi-conductor in one direction than in an opposite direction. The term "small area contact" has become definitive in the art of substantially punctiform contact to a surface such as produced by a pointed wire electrode as well as "line" contact such as produced by an electrode having a sharpened edge.

It has recently become known that the conduction between these two electrodes may be modified and controlled by introducing an additional electrode which makes a small-area contact to the semi-conductor in close proximity to the first point of small-area contact. Such "multi-electrode" asymmetrically conductive contact devices have become known as "transistors," and may be employed as the control elements in amplifying or oscillating circuits in a manner somewhat similar to electronic discharge devices.

The conventional manner of construction of the small-area contacts of these duo-electrode and multi-electrode asymmetrically conductive contact devices has been to bring the sharpened point of a thin electrically conducting filament or "whisker" into contact with a surface of the semi-conductor. If mass production of these devices is attempted, however, many difficulties are encountered in both the sharpening of the whisker to the extremely fine point required as well as in the assembly of these fragile whiskers into their proper position within the device. In addition the extremely low heat dissipation characteristics of these whiskers limits the current carrying capacity of the device to a small value.

Accordingly, a principal object of my invention is to provide a structure for asymmetrically conductive devices which produces a small-area contact between an electrode and a semi-conductor without the use of a filament-like electrode or "whisker."

Another object of my invention is to provide asymmetrically conductive devices having a much higher current carrying capacity than the conventional whisker type point contact devices.

A further object of my invention is to provide a small-area contact structure for asymmetrically conductive devices which easily lends itself to mass production techniques.

A still further object of my invention is to provide asymmetrically conductive devices, both of the duo-electrode and multi-electrode type which have improved small-area contact structures.

A still further specific object of my invention is to provide a small-area contact structure for asymmetrically conductive devices which may be easily adjusted to have the proper contact pressure between the contacting electrode and the semi-conductor.

In general, my invention results from an appreciation of the fact that a spherical surface is tangent to a linear, planar, or to another spherical surface at only one point. I have found that asymmetrically conductive devices having substantially the same rectification characteristics as the conventional whisker type contact devices can be produced by employing a small-area tangential contact between an electrode and a semi-conductor in which at least one of the contacting surfaces has a spherical configuration. The word "tangential" is used in this specification and appended claims to denote any "touching" contact made by a straight or curved line or surface to a substantially single point on a curved line or surface.

This discovery is of particular significance in light of a new technique for the mass production of substantially spherical semi-conductor units which has recently been invented, and which forms the subject matter of patent application No. 134,826 filed in the name of Harper Q. North on December 23, 1949, now Patent 2,712,621, dated July 5, 1955, and assigned to the same assignee as the present invention. In this new technique, melted droplets of the semi-conductor fall into a liquid quenching bath and the resulting substantially spherical pellets, when properly processed, have approximately the same rectification characteristics as the wafer-type semi-conductor units conventionally employed in asymmetrically conductive devices.

The novel features which I believe to be characteristic of my invention are set forth with particularity in the appended claims. My invention itself, however, together with further objects and advantages thereof, can best be understood by reference to the following description taken in connection with the accompanying drawing in which:

Figure 2:
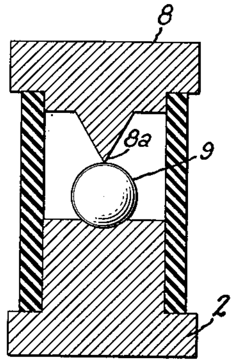
Fig. 2 is a similar view of a two electrode device wherein the small-area contact is made between a spherically surfaced semi-conductor unit and the linear edge of a wedge shape conductor electrode.
Figure 2A:
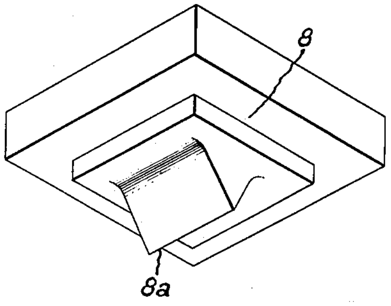
Figure 3:
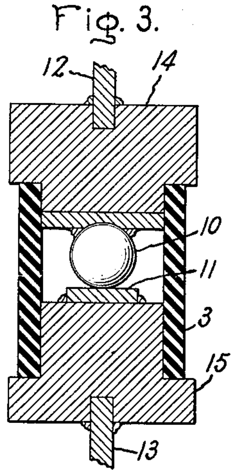
Figure 4:
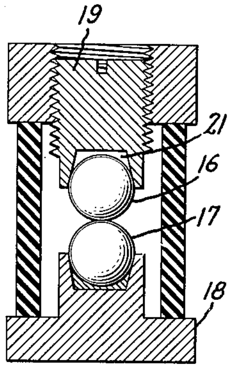
Figure 5:
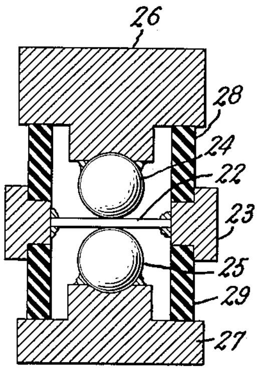
Figure 6:
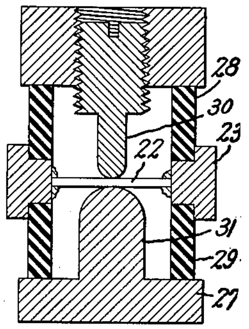
Figure 7:
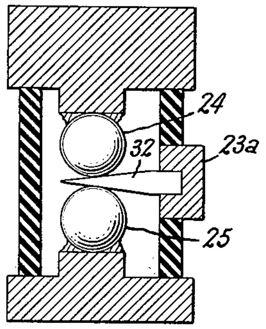
Figure 8:
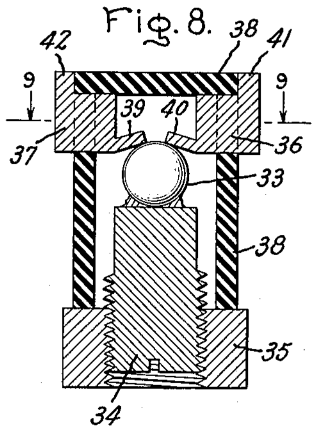
Figure 9:
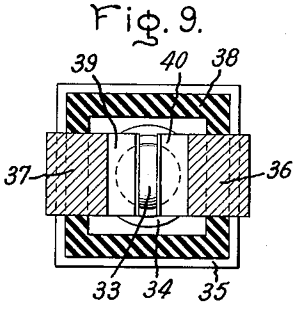

Fig. 2*a* is an enlarged and perspective view of a collar member conductor electrode of Fig. 2;

Fig. 3 is an enlarged sectional view of a two electrode device wherein the small-area contact is made between a spherically surfaced conductor and a planar type semi-conductor unit;

Fig. 4 is an enlarged sectional view of a two electrode device wherein the small-area contact is made between a spherically surfaced conductor and a spherically surfaced semi-conductor unit;

Fig. 5 is a similar view of a three electrode asymmetrically conductive device or "transistor" wherein a pair of spherical conductor electrodes make small-area contact to opposite sides of a thin semi-conductor slab;

Fig. 6 is a similar view of a modification of the device of Fig. 5 wherein only the contacting portion of the conductor electrodes have a spherical surface configuration;

Fig. 7 is a similar view of a further modification of the device of Fig. 5 which employs a wedge-shape semi-conductor wafer;

Fig. 8 is a sectional view of a three electrode asymmetrically conductive device in which a pair of planar electrodes make adjacent small-area contacts to a spherically surfaced semi-conductor;

Fig. 9 is a sectional view of the device of Fig. 8 taken along line 9—9 of Fig. 8 to show certain details of its construction.

Figure 1:
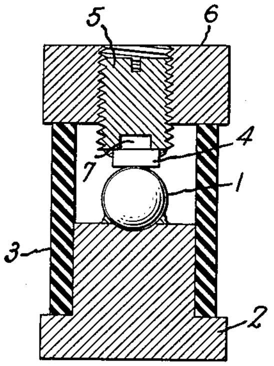
Fig. 1 is an enlarged longitudinal sectional view of a two electrode asymmetrically conductive device in which the small-area contact is made between a spherically surfaced semi-conductor unit and a planar conductor electrode.

Referring to Figs. 1, 2, 3 and 4, I have shown simple two-electrode rectifiers in accordance with my invention. In Fig. 1, a spherical pellet 1 of a semi-conductor, preferably germanium, is supported in good electric conducting relation with a metal plug 2, which may be encased within a cylindrical insulating housing 3. A slight concave recession is preferably formed in the plug 2 to seat the pellet 1, whose bottom surface may then be tinned and soldered to the plug over a fairly large area.

In order to form the required small-area contact to the semi-conductor, a flat conductor electrode 4, which may for example be tungsten or a platinum-iridium alloy, is supported in tangential contact with the spherical surface of the semi-conductor 1 by a second metal plug 5 which may be threaded within a collar member 6, as shown. The collar member 6 also serves as one external terminal of the device and is maintained in good electrical contact with the conducting electrode 4 by the plug 5. The other external terminal of the device is formed by an externally extending portion of plug 2 whose internal surface is in direct "large-area" contact with the semi-conductor as described above.

In order to enable an easy adjustment of the critical contact pressure between the conducting electrode 4 and the semi-conductor 1, a slight recess 7 may be formed in the supporting plug 5 immediately opposite the point of contact such that a small space exists between the surface of the plug 5 and the flat surface of the electrode 4. By merely adjusting the position of the plug 5 with respect to the collar 6, the contact pressure of the electrode 4 upon the semi-conductor unit 1 can be varied in small increments due to the bending of the electrode 4 within the space thus provided.

Germanium pellets, with a diameter in the neighborhood of 0.040 inch, such as those produced by the technique described in the aforementioned North patent application, have been found to give excellent results although considerable variation in size may, of course, be tolerated. If germanium is used, these pellets may have either P-type or N-type conduction characteristics and may have etched surfaces to improve their rectification properties, as is well known in the art. In tests which were conducted, the same germanium pellets were first used with a whisker type sharpened point contact and then were used with a planar electrode contact in accordance with my invention. The results of these tests indicate that there is no substantial difference in rectification properties regardless of which type of small-area contact is employed. Due to the much greater mass of the planar type contact, however, the current carrying capacity of devices constructed in accordance with my invention is much greater than that of the conventional sharpened whisker type contact.

Referring to Fig. 2, I have shown a modification of my invention wherein the capacitance between the semi-conductor and the conductor electrode may be minimized and a more definite small-area point contact produced. In this modification, a linear edge 8*a*, best seen in Fig. 2*a*, is formed on the conductor electrode 8 and a spherical semi-conductor unit 9 makes tangential contact with the edge of the conductor electrode 8. The contacting portion of the conductor electrode 8 is preferably wedge-shape as shown in Fig. 2*a* with the linear edge 8*a* being formed at the apex of the wedge. The remainder of the construction of the device shown in Fig. 2 is similar to that of the device of Fig. 1 with the exception that the contacting pressure is not shown as being adjustable.

Referring to Fig. 3 I have shown another modification of my invention similar to that of Fig. 1, but with planar and the spherical contacting surfaces in reversed arrangement. In Fig. 3 a spherical contacting electrode 10 makes small-area contact with a flat semi-conductor unit 11. In this modification a pair of externally extending terminal leads 12 and 13 are connected in conductive contact through suitable supporting plugs 14 and 15 to the spherical conducting electrode 10 and to the semi-conductor 11 respectively. No provision is made for the adjustment of the contact pressure since the contact pressure may be adjusted to an optimum value during manufacture and the entire device may then be hermetically sealed within the tubular insulating housing 3.

In Fig. 4, I have shown a still further modification of a diode rectifier in accordance with my invention wherein the small-area contact is accomplished by the use of two spherically shaped bodies, one of which is the conducting electrode 16 and the other of which is the semi-conductor 17. In this modification, a semi-conductor supporting plug 18 has a cup-shaped recess which serves to firmly maintain the semi-conductor in its proper position. An adjustable conductor electrode supporting plug 19 also has a cup shaped recess 21 with conically tapered sides such that the spherical conducting electrode 16, when inserted within the recess 21, rests upon its tapered sides. By tightening the plug 19, the spherical conducting electrode 16 is forced deeper within the recess 21 and exerts an outward bending force upon the tapered sides bounding the recess 21. An increasing contact pressure thereby results upon the semi-conductor sphere 17 which may be varied in relatively small increments. It will be understood, of course, that any of the incidental structural features shown in each of the diode rectifier modifications of my invention in Figs. 1, 2, 3 and 4 may be interchangeably employed in any other one of these modifications.

Referring now to Figs. 5, 6, 7, 8 and 9, I have shown my invention in conjunction with three electrode asymmetrically conductive devices or "transistors." In such transistors, the variation of current through the semi-conductor and one small-area contacting electrode, which may be termed the "emitter" electrode, can be made to produce a larger variation in the current flowing through the same semi-conductor and another small-area contacting electrode commonly called the "collector" electrode. The distance between the two contact points of the two small-area contacting electrodes must be very small, however, in the order of a few thousandths of an inch, before this interaction will occur.

In Fig. 5 I have shown a coaxial type transistor constructed in accordance with my invention wherein a thin slab 22 of semi-conductor material in the order of a few thousandths of an inch thick is supported by soldering, or other suitable means, in good electrical contact within the center of an annular conducting collar 23 which forms one of the terminals of the device. A pair of spherically surfaced electrodes 24 and 25 respectively are disposed in contact with opposite faces of the slab 22 and supported by a pair of plugs 26 and 27 which have external portions functioning as the other two terminals of the device. A pair of tubular insulating members 28 and 29 are sealed between the central collar 23 and the external end portions of plugs 26 and 27 respectively, and serve to enclose and hermetically seal the semi-conductor 22 and the electrodes 24 and 25. Either electrode 24 or 25 may be interchangeably connected through plugs 26 and 27 respectively to an external circuit as either the emitter or the collector electrode while the center terminal 23 serves as the common return connection.

As illustrated by the modification shown in Fig. 6, it is not necessary that separate complete spheres, such as shown in Fig. 5, be employed as the electrodes although such complete spheres normally lend themselves to mass production techniques. In certain applications it may be more convenient merely to round off the contacting surfaces of a pair of end plugs. In Fig. 6, such rounded plugs are shown at 30 and 31 in conjunction with a transistor constructed in a manner similar to that of Fig. 5.

In Fig. 7 I have shown a further modification of the basic coaxial transistor of Fig. 5 wherein a wedge shaped semi-conductor slab 32 is used in order to permit an easy adjustment during manufacture of the distance between the opposing small-area contacting spherical electrodes 24 and 25. This modification preferably has a four-sided cross section rather than the circular cross section of Fig. 5 while a central return terminal 23*a* extends only through one side instead of entirely around the circumference of the device. By varying the distance of the contacting electrodes from the apex of the wedged slab 32 during manufacture, the distance between the electrodes both through the semi-conductor and along the surface of the semi-conductor 32 can be adjusted to an optimum value.

Referring to Figs. 8 and 9 I have illustrated another form of a transistor constructed in accordance with my invention wherein two small-area contacts are made by adjacent electrodes upon a spherically surfaced semi-conductor. A large-area contact is made between a spherical semi-conductor unit 33 and a conducting plug 34 which is preferably threaded through the center of a four sided collar 35. Two electrode members 36 and 37 are secured to opposite sides of an insulating housing 38 and have internally extending oppositely aligned flanges 39 and 40 respectively. These flanges 39 and 40 have opposing ends which are almost touching and are preferably constructed to be thin enough so that they are slightly deformable due to their inherent elasticity. Externally extending portions 41 and 42 of the electrodes 36 and 37 form their respective external terminals. The semi-conductor pellet 33 makes contact with the lower adjacent corner of each flange 39 and 40, and by varying the depth of the pellet 33 within the device, the distance between the contact points of the flanges to the sphere as well as the pressure thereof can be easily adjusted.

Although I have shown certain specific embodiments of my invention, many further modifications can be made and will occur to those skilled in the art. It is to be understood, therefore, that I intend by the appended claims to cover all such modifications as fall within the true spirit and scope of my invention.

What I claim as new and desire to secure by Letters Patent in the United States is:

1. An asymmetrically conducting device comprising a semi-conductor member, a first electrode member in relatively large area contact with said semi-conductor, and a second electrode member, said semi-conductor and second electrode members having a substantially spherical configuration, and making small area tangential contact with the other thereof.

2. An asymmetrically conductive device comprising a spherical pellet of semi-conductor material, a first electrode in relatively large area contact with said spherical semi-conductor pellet, and at least one other electrode in relatively small-area tangential contact with said spherical semi-conductor pellet.

3. An asymmetrically conducting device comprising a spherical pellet of semi-conductor material, a first electrode in relatively large area contact with said spherical semi-conductor pellet, and at least one other electrode having a substantially spherical configuration and making relatively small-area contact with said spherical semi-conductor pellet.

4. An asymmetrically conductive device comprising a member of semi-conductor material, a first electrode member in relatively large area contact with said semi-conductor member, and a second electrode member, one of said semi-conductor and second electrode members having a substantially planar surface configuration and the other of said semi-conductor and second electrode members having a substantially spherical configuration and making tangential contact with a point on said planar surface.

5. An asymmetrically conductive device comprising a member of semi-conductor material, a first electrode member in relatively large area contact with said semi-conductor member, and a second electrode member, one of said semi-conductor and second electrode members being constructed to have a linear edge and the other of said semi-conductor and second electrode members having a substantially spherical configuration and making tangential contact with a point on said edge.

6. An asymmetrically conductive device as described in claim 2 wherein the small-area contacting electrode has a substantially planar contacting surface.

7. An asymmetrically conductive device as in claim 4 wherein the second electrode member has the substantially planar contacting surface configuration and the semi-conductor has the substantially spherical configuration.

8. An asymmetrically conductive device as described in claim 5 wherein the second electrode member has the edge formed thereon and the semi-conductor member has the substantially spherical configuration.

9. An asymmetrically conductive device as described in claim 1 wherein the semi-conductor material comprises germanium.

10. An asymmetrically conductive device as described in claim 2 wherein the semi-conductor material comprises germanium.

11. An asymmetrically conductive device as described in claim 3 wherein the semi-conductor material comprises germanium.

12. An asymmetrically conductive device as described in claim 4 wherein the semi-conductor material comprises germanium.

13. An asymmertically conductive device as described in claim 5 wherein the semi-conductor material comprises germanium.

14. An asymmetrically conductive device as described in claim 2 wherein the semi-conductor material comprises germanium and the small-area contacting electrode has a substantially planar contacting surface.

15. An asymmetrically conductive device as described in claim 5 wherein the semi-conductor material comprises germanium, the second electrode member has the edge formed thereon, and the semi-conductor member has the substantially spherical configuration.

16. An asymmetrically conductive device as described in claim 5 wherein the semi-conductor member has the spherical configuration and a third electrode member having a linear edge is arranged in tangential contact with the semi-conductor member at a point in close proximity with the tangential contact between said second electrode member and said semi-conductor member.

17. An asymmetrically conducting device comprising a body of semi-conductor material having opposing surfaces, a first electrode in relatively large area contact with said semi-conductor body, and a pair of spherical electrodes aligned in contact with said opposing surfaces and making relatively small area tangential contact therewith.

18. An asymmetrically conducting device comprising a thin slab of semi-conductor material, a first electrode in relatively large area contact with said semi-conductor body, and a pair of spherical electrodes aligned in contact with said opposing surfaces and making relatively small area tangential contact therewith.

(References on following page)

References Cited in the file of this patent

UNITED STATES PATENTS

| | | |
|---|---|---|
| 756,676 | Midgley | Apr. 5, 1904 |
| 1,908,800 | Utne | May 16, 1933 |
| 2,402,661 | Ohl | June 25, 1946 |
| 2,429,933 | Gibson | Oct. 28, 1947 |
| 2,549,550 | Wallace | Apr. 17, 1951 |
| 2,560,579 | Kock et al. | July 17, 1951 |
| 2,584,461 | James et al. | Feb. 5, 1952 |
| 2,597,734 | James et al. | May 20, 1952 |
| 2,612,567 | Stuetzer | Sept. 30, 1952 |

OTHER REFERENCES

Physical Review, February 15, 1949, pages 689–690.